Aug. 31, 1954   W. A. EDSON ET AL   2,688,122
CONSTANT Q RESONATOR
Filed Aug. 28, 1947

INVENTORS: W. A. EDSON
          I. G. WILSON
BY
N. D. Ewing
ATTORNEY

Patented Aug. 31, 1954

2,688,122

UNITED STATES PATENT OFFICE 2,688,122

CONSTANT Q RESONATOR

William A. Edson, Atlanta, Ga., and Ira G. Wilson, New York, N. Y., assignors to Bell Telephone Laboratories, Incorporated, New York, N. Y., a corporation of New York Application August 28, 1947, Serial No. 771,002

5 Claims. (Cl. 333—83)

This invention relates to frequency selective devices and more particularly to tunable electrical resonance chambers.

An object of the invention is to render the quality or Q factor of a resonance chamber more uniform over an extended tuning range.

Another object of the invention is to degrade the Q factor of a resonance chamber over a portion of its tuning range to thereby render the chamber's ring-time substantially constant over an extended tuning range.

Another object of the invention is to maintain the ring-time of an echo box substantially constant over a predetermined tuning range by the projection of an absorber into the echo box's cavity.

A feature of the invention is a movable plunger of lossy material associated with the tuning piston of a resonant chamber. As the piston moves to vary the tuning of the resonant chamber over a predetermined frequency range, the absorber is projected therefrom into the chamber space to degrade the Q, whereby to render it and the ring-time independent of frequency.

Referring to the figures of the drawing.

The invention disclosed herein is in the nature of an improvement over the constant ring-time resonant chamber disclosed in the copending United States application, Serial No. 575,515, filed January 31, 1945, by W. A. Edson, which issued as U. S. Patent 2,465,639, March 29, 1949.

In accordance with the present invention, equalization of the Q factor and constancy of ring-time over an extended tuning range is achieved mechanically and electrically by projecting a lossy material into the cavity space during the piston travel. In one exemplary embodiment of the invention, this is accomplished by mechanically associating the lossy material with the tuning piston in such a manner that for one portion of piston travel, the lossy material is retracted into the piston, while for another portion of travel the lossy material is projected into the cavity to move differentially with respect to the piston. In this manner, the degradation introduced by the presence of the lossy material in the cavity may be arranged to vary with frequency in a manner to achieve desired characteristics, such as equalization of the Q over an extended tuning range and rendering the cavity chamber's ring-time independent of frequency.

In object locating systems employing reflected electromagnetic waves, it is customary to employ testing apparatus which includes a resonance chamber, variously designated as "ring box," "echo box" or "ringing cavity." The purpose of the resonance chamber aforementioned is to build up an internal electromagnetic field upon reception of a pulse from the transmitter and, upon cessation of said pulse, to reradiate oscillations of the same frequency to the radar receiver for a period designated as the "ring-time" of the resonance chamber.

It has been customary to associate with such resonant chambers a quality factor, designated as the Q factor generally defined as $$A = 2\pi \frac{\text{Total energy stored}}{\text{Energy lost per cycle}}$$

In particular, an echo box will reradiate for a time $t$, designated as the ring-time, and more fully explained in the aforementioned W. A. Edson patent. As the chamber is tuned to various frequencies in a range, it is found that the "ring-time" does not remain constant as generally desired for testing, but rather varies with frequency, even though the same pulse is applied thereto. In the aforementioned United States Patent No. 2,465,639 of applicant, various expedients are disclosed for equalizing the Q factor over an extended tuning range and rendering the ring-time independent of frequency.

Similar and improved results, and a greater degree of flexibility may be achieved by mechanical and electrical means in accordance with the present invention.

Figure 1:
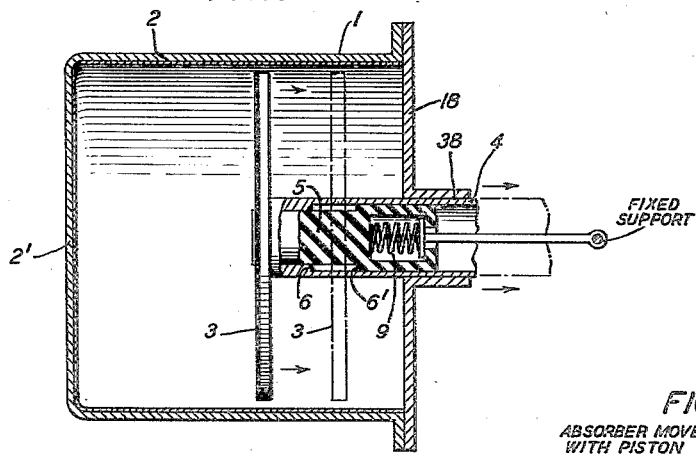
Fig. 1 shows a high Q resonant cavity in accordance with the invention.

Referring to Fig. 1 there is illustrated in section a cavity resonator 1 which may be provided with the usual input and output coupling systems, for example, of the type disclosed in the United States Patent 2,414,456, issued January 21, 1947, to W. A. Edson. Such connections have been omitted from the drawings for purposes of simplification.

The resonator 1 is a cylindrical chamber coated on its interior 2 and end wall 2' with highly conductive plating such as silver or gold or the like to provide a high Q. A similarly coated tuning piston 3 is movable to and fro for tuning the resonator to a desired frequency in a predetermined range as disclosed in the aforementioned W. A. Edson patent, No. 2,465,639. Graph A (Fig. 2) shows the ring-time variation of an uncompensated echo box 1, indicating that the ring-time varies 1.4 in a frequency range of 12 per cent as disclosed and explained in the aforementioned copending application, Serial No. 575,515, which issued as U. S. Patent 2,465,639, March 29, 1949.

A closure plate 18 for the chamber is provided with a bearing 38 for guiding the piston shaft 4 in its motion.

However, in accordance with the present invention the hollow shaft 4 of the tuning piston 3 is provided with a plunger 5 of lossy dielectric material, such as Bakelite, conductive rubber, polyiron and the like. The plunger 5 is spring-operated to project into the cavity space for a portion of the travel of the piston, to degrade the Q factor. Over the remaining portion of piston travel, the lossy plunger 5 is retracted into the hollow shaft by the engagement of projection 6 thereon with shoulder 6' of the plunger. For the corresponding frequency range, the plunger and piston are relatively stationary with respect to each other and substantially no equalization of Q or ring-time is provided during this interval.

Figure 2:
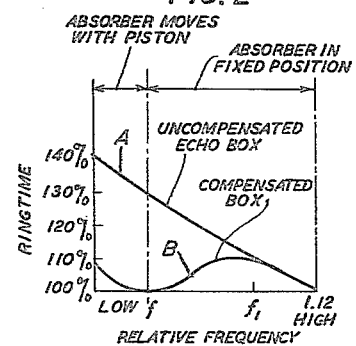
Fig. 2 shows the frequency variation of the ring-time thereof.

The nature of the equalization of Q and ring-time achieved in accordance with the movement over an extended tuning range may be visualized from a consideration of graph B in Fig. 2 as applied to the structure shown in Fig. 1.

Starting at the high frequency end of graph B the relationship of the plunger 5 to the piston 3 is such that the plunger is retracted slightly into the piston or approximately flush therewith, so as to render the Q and ring-time characteristic coincident with that of the uncompensated chamber over a small frequency interval. Then as the piston moves to the right as indicated in Fig. 1, more and more of the lossy plunger projects into the cavity space, resulting in increasing loss and a falling off in ring-time. The maximum loss occurs at a frequency $v$ corresponding to the engagement of shoulders 6—6' and maximum protrusion of the plunger into the cavity space. Thereafter, the loss decreases and the ring-time increases rising to 110 per cent value indicated and gradually tending toward the ring-time characteristics of the uncompensated chamber. Compensation of Q and substantial constancy thereof with frequency occurs in the interval $v_1$—$v$, where the slopes of A and B curves are opposed.

Figure 3:
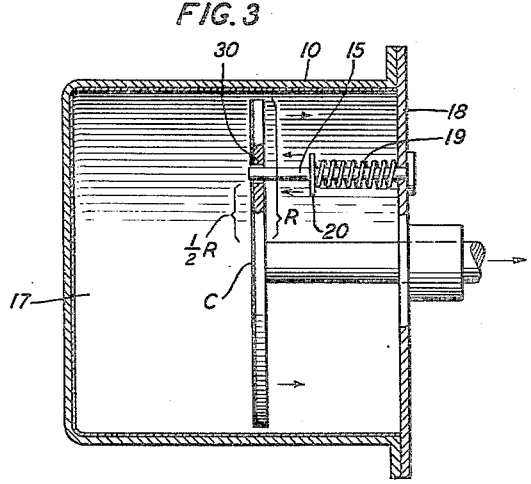
Fig. 3 is a modification of the high Q resonance chamber.

Referring to Fig. 3, a modification of the resonance chamber is shown, wherein equalization of the ring-time is obtained over an extended tuning range by projecting a loss device 15 into the cavity space 17. As shown in Fig. 3, the closure lid 18 for the resonance chamber 10 is provided with a metallic bolt 15 having a spring 19 wound on its shank, which bears against a washer 20. The head of the bolt 15 is fixed to the closure plate 18 and its shank fits through an opening 30 in the piston surface. The piston 3 in moving toward the right to tune the cavity at the lower frequency portion of the range, causes the increased projection of bolt 15 into the cavity space, thereby degrading the Q and lowering the ring-time.

The loss device 15 is positioned off-center at half the radius to degrade principally the main operating mode $TE_{01n}$ in accordance with the equalizing characteristics illustrated in Fig. 2B aforementioned.

If in addition, it is desired concomitantly to suppress $TE_{02n}$, $TE_{03n}$ extraneous modes, the losser device 15 would be situated at positions where the field intensity of such modes is high, namely, 25 per cent radius, 63 per cent radius, respectively as measured from the center C.

It should also be appreciated that although the disclosure has been principally directed to equalization of Q and ring-time, it is also within the scope of the invention to project a plunger into a cavity in a manner to secure a predetermined and useful variation of these factors with frequency.

What is claimed is:

1. A hollow resonator of high Q having a space substantially free of energy absorbing material, said resonator containing electromagnetic energy in a predetermined mode of oscillation, a movable piston for tuning said resonator, and means for equalizing the Q over an extended tuning range, said means being a lossy material connected to said piston and continuously projectible therefrom over a portion of the tuning range into said resonator space to variably absorb said mode.

2. The structure of claim 1, said equalizer being retracted over the remaining portion of the tuning range, said equalizer being located on said piston in a region of high field intensity for $TE_{01n}$ mode.

3. A hollow resonator of high Q, movable tuning means therefor and an absorber connected to said tuner, comprising a lossy dielectric plunger adapted to project through said tuner, and means for differentially moving said absorber relative thereto to control the decrement of said resonator, said means adapted to continuously move said absorber into the resonator space.

4. A hollow resonator of high Q, a tuning piston therefor, equalizing means comprising a spring-operated plunger of lossy material adapted to be projected into said resonator to degrade the Q of said resonator in a predetermined manner with frequency, and means for retracting said plunger into said piston when the Q is equalized, whereby the Q is unchanged for the corresponding frequency range and the plunger and piston are relatively stationary with respect to each other.

5. A hollow resonator of high Q, a movable tuning means therefor, and Q equalizing means comprising a lossy device connected to a conductive boundary of said resonator, and means for continuously projecting said equalizer into said resonator as said tuning is varied over a predetermined band wherein said lossy device is located in regions of high field intensity for $TE_{01n}$ mode.

References Cited in the file of this patent

UNITED STATES PATENTS

| Number | Name | Date |
|---|---|---|
| 2,414,785 | Harrison et al. | Jan. 21, 1947 |
| 2,439,388 | Hansen | Apr. 13, 1948 |
| 2,465,639 | Edson | Mar. 29, 1949 |